United States Patent
Gupta et al.

(10) Patent No.: US 10,198,511 B1
(45) Date of Patent: Feb. 5, 2019

(54) DATACENTER SEARCH QUERY INTERPRETATION SYSTEM

(71) Applicant: VMWARE, INC., Palo Alto, CA (US)

(72) Inventors: Kshitij Gupta, Karnataka (IN); Mukul Gupta, San Jose, CA (US); Shiv Agarwal, Milpitas, CA (US); Abhijit Sharma, Maharashtra (IN)

(73) Assignee: VMware, Inc., Palo Alto, CA (US)

( * ) Notice: Subject to any disclaimer, the term of this patent is extended or adjusted under 35 U.S.C. 154(b) by 320 days.

(21) Appl. No.: 14/592,845

(22) Filed: Jan. 8, 2015

Related U.S. Application Data (63) Continuation-in-part of application No. 14/464,579, filed on Aug. 20, 2014.

(51) Int. Cl.
| | |
|---|---|
| G06F 17/00 | (2006.01) |
| G06F 17/30 | (2006.01) |
| H04L 29/06 | (2006.01) |
| G06F 9/455 | (2018.01) |

(52) U.S. Cl.
CPC .... *G06F 17/30864* (2013.01); *G06F 9/45533* (2013.01); *G06F 17/30554* (2013.01); *G06F 17/30684* (2013.01); *H04L 65/403* (2013.01)

(58) Field of Classification Search
CPC ...................... G06F 17/30684; G06F 9/45533
See application file for complete search history.

(56) References Cited

U.S. PATENT DOCUMENTS

| | | |
|---|---|---|
| 4,958,285 A | 9/1990 | Tominaga |
| 6,433,802 B1 | 8/2002 | Ladd |
| 6,483,812 B1 | 11/2002 | Prorock |
| 7,096,219 B1 | 8/2006 | Karch |
| 7,788,587 B2 | 8/2010 | Michelman |
| 7,992,102 B1 | 8/2011 | De Angelo et al. |
| 8,230,339 B2 | 7/2012 | Watanabe et al. |
| 8,266,550 B1 | 9/2012 | Cleron et al. |
| 8,443,293 B2 | 5/2013 | Soerensen et al. |
| 9,015,730 B1 * | 4/2015 | Allen ...................... G06F 9/541 |
| | | 719/310 |
| 9,760,870 B2 * | 9/2017 | Norton ................... G06Q 10/02 |
| 2001/0042118 A1 * | 11/2001 | Miyake ................... H04L 41/12 |
| | | 709/223 |
| 2002/0186827 A1 | 12/2002 | Griffiths |
| 2003/0184580 A1 | 10/2003 | Kodosky et al. |
| 2006/0052998 A1 | 3/2006 | Michelman |
| 2006/0106585 A1 * | 5/2006 | Brown ....................... G06F 8/20 |
| | | 703/1 |
| 2007/0274239 A1 | 11/2007 | Nguyen et al. |
| 2008/0059487 A1 | 3/2008 | Mi et al. |
| 2008/0195677 A1 | 8/2008 | Sudhakar et al. |
| 2008/0288637 A1 | 11/2008 | Nagaraja et al. |
| 2009/0144148 A1 | 6/2009 | Jung et al. |
| 2009/0216572 A1 | 8/2009 | Anderson |

(Continued)

*Primary Examiner* — Charles E Lu (57) ABSTRACT

A computerized datacenter contextual search query interpretation method includes receiving a search query from a user; displaying search suggestions based on the search query and obtaining a selected one of the search suggestions. Any time period associated with the search query is identified, instructions based on the selected search suggestion and any time period for searching a data model of a datacenter are generated to obtain search results and display a graphical visualization of the search results.

15 Claims, 5 Drawing Sheets

(56) References Cited

U.S. PATENT DOCUMENTS

| | | | |
|---|---|---|---|
| 2009/0276771 A1* | 11/2009 | Nickolov | G06F 9/4856 |
| | | | 717/177 |
| 2010/0064225 A1 | 3/2010 | Cunningham et al. | |
| 2010/0180092 A1 | 7/2010 | Rajaa et al. | |
| 2010/0257457 A1* | 10/2010 | De Goes | G06Q 10/10 |
| | | | 715/751 |
| 2011/0047466 A1 | 2/2011 | Michelman | |
| 2011/0173184 A1 | 7/2011 | Kelshikar et al. | |
| 2012/0020581 A1 | 1/2012 | Zarom | |
| 2012/0110046 A1 | 5/2012 | Oba | |
| 2012/0303325 A1 | 11/2012 | Depue et al. | |
| 2013/0124712 A1 | 5/2013 | Parker | |
| 2013/0305364 A1 | 11/2013 | Haikney et al. | |
| 2014/0369229 A1 | 12/2014 | Martineau | |
| 2015/0040052 A1 | 2/2015 | Noel et al. | |
| 2016/0050540 A1* | 2/2016 | Peiris | G06F 17/30401 |
| | | | 455/456.3 |

* cited by examiner

Fig. 5 a# DATACENTER SEARCH QUERY INTERPRETATION SYSTEM

RELATED APPLICATIONS

This application claims the benefit of the filing of application Ser. No. 14/464,579, filed on Aug. 20, 2014.

BACKGROUND

Modern datacenters include large numbers of physical and virtual entities. Examples of physical entities may include application servers, storage servers, load balancers, network interface cards (NICs), firewalls, switches, routers, etc. Almost any of these physical entities can be virtualized as software entities, such as virtual machines (VM), virtual firewalls, virtual switches, virtual routers, virtual extensible local area networks (VXLANs), etc.

Virtual entities increase the complexities of monitoring, troubleshooting, searching characteristics of, and visualizing these dynamically configurable networks. Existing systems may only monitor and collect data for a subset of physical or virtual components within the datacenter. Existing systems also may not be able to understand these new architectures, entities, and the relationships between these entities. Thus, present systems may not effectively monitor or visualize the physical and virtual entity configurations within modern datacenters, and may not provide adequate capabilities to search characteristics of such datacenters.

Additional aspects and advantages of this invention will be apparent from the following detailed description of preferred embodiments, which proceeds with reference to the accompanying drawings.

DETAILED DESCRIPTION

Computerized search queries (referred to herein as search queries) are entered into computer systems by users or computer automations to retrieve information regarding a wide range of topics. Most commonly, search queries are directed to retrieving text-based information or computer files that are stored according to a text-based filing system. In contrast, a computer network search query is a user-generated query directed to retrieving information about the operation, status, or performance of a computer network or system. Such a network could be implemented as a localized LAN or as a distributed datacenter that includes extensive computer or data storage systems, both physical and virtual, that may be distributed geographically, even globally. A computer network search query differs from conventional text search queries in that text search queries are directed to and based upon the same words and syntax that are included in the information being searched. In contrast, the terminology used in a computer network search query relates to virtual or physical computer entities or characteristics relating to them. In the typically simplified syntax of user-generated computer network status search queries, the terminology that is used can have multiple interpretations.

An aspect of computer network status search queries is, therefore, to determine a most suitable or likely—correct interpretation of a computer network search query in relation to the intent of the user, namely, the network information the user intends to obtain. Various network factors play a role in obtaining an interpretation of a computer network search query that is most-likely a correct reflection of a user's intention, including knowledge of the domain of the computer network, the data model of the network, and actual data relating to the network. Once a computer network search query is interpreted, a correct search of network characteristics can be conducted and results displayed to the user, together with alternate interpretations in the form of "Did you mean" search queries.

Figure 1:
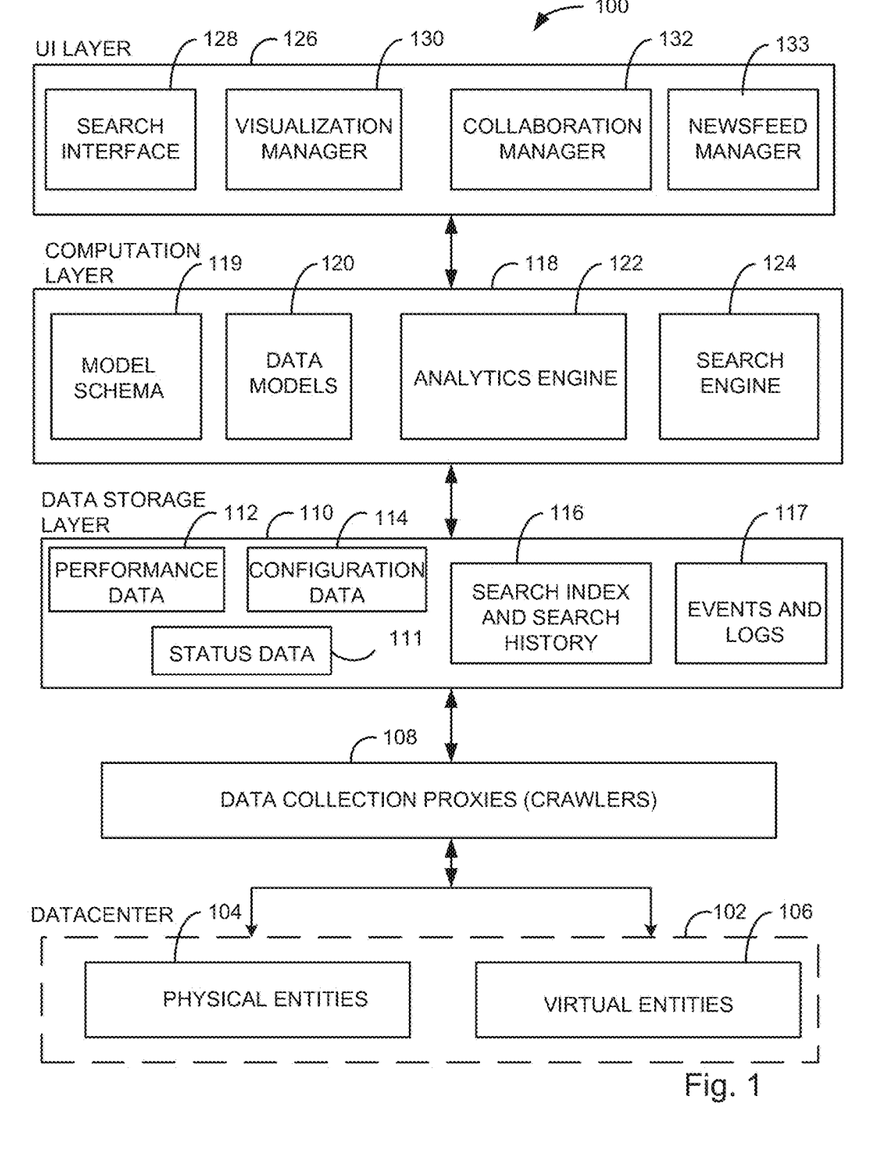
FIG. 1 is a block diagram of an example datacenter management system.

FIG. 1 is a block diagram illustrating a datacenter management system 100 as an operating environment of the present invention. A natural language based search engine operates within the context of the datacenter domain and identifies the intent of search queries. The search engine uses the models to more efficiently search and visualize current and historical events within the datacenter. These models can be known previously and can continue to extend or evolve. Alternatively, these models could be learned from data itself by association, frequency and other techniques. Datacenter management system 100 may also include a collaboration feature that enables users to more effectively exchange datacenter information.

FIG. 1 depicts datacenter management system 100 in association with a datacenter 102 that includes various physical entities 104 and virtual entities 106. Physical entities 104 may comprise any physical devices used for processing, storing, and/or exchanging data. A few examples of physical entities 104 include application servers, storage servers, load balancers, network interface cards (NICs), firewalls, switches, routers, client devices, etc. Virtual entities 106 may include any entities virtualized in software, such as virtual machines (VM), virtual firewalls (VFW), virtual switches, virtual routers, virtual extensible local area networks (VXLANs), etc. Datacenter 102 also may include different logical entity relationships, such as layer 2 and layer 3 logical networks. These are just examples of an almost limitless number of different physical and virtual entities and relationships that may exist within datacenter 102.

Datacenter management system 100 may use time-series based modeling of entities and properties (Objects) to effectively capture the evolving state of a datacenter. Models represent physical, virtual, and logical entities and entity relationships for different periodic and aperiodic events. The management system captures different status, performance data and configuration data associated with the entities. The status data may indicate information about the state, configuration, etc. of the entities. The performance data measures performance of different entities, such as central processing unit (CPU) utilization, memory utilization, packet drops, etc. The configuration data identifies configurations within entities, such as the number of CPUs assigned to a virtual machine or the rules used by a physical or virtual firewall.

Data collection proxies 108 are alternatively referred to as crawlers that collect and store data from physical entities 104 and virtual entities 106 in a data storage layer 110. The data may include status data 111, performance data 112, configuration or change data 114, and event and log data, such as alerts, problems, faults, etc. Management system 100 also may store search indexes and search histories 116 from search queries.

Status data 111 includes a wide range of information about the datacenter and entities within it and may include counts of various parameters, operational status or observations, etc. Performance data 112 may be associated with the performance of any entity or combination of entities in datacenter 102, and various other data that are statistical in nature (like packets count) and change across time. Examples of performance data 112 include CPU utilization, packet processing, packet transmission and reception drops, memory utilization, etc. Examples of configuration data 114 include any information associated with the configuration of any entity or combination of entities in datacenter 102. Examples of configuration data 114 include a number of CPUs assigned to a VM, network and communication paths in a VXLAN, rules in a physical or virtual firewall, NICs connected to a VM, changes in system configurations, etc. These are just a few examples of almost limitless types of performance and configuration data.

Data collection proxies 108 may periodically collect performance data 112 and/or configuration data 114. For example, proxies 108 may monitor CPU utilization for a VM every ten minutes and save the utilization values as part of performance data 112. Data collection proxies 108 may aperiodically collect other performance data 112 and/or configuration data 114. For example, collection proxies 108 may identify the number of CPUs assigned to a VM as part of configuration data 114.

Data collection proxies 108 may include any combination of existing and customized programs for monitoring and extracting data from entities 104 and 106. For example, physical entities 104, such as routers and switches, may include application program interfaces (APIs) for extracting CPU utilization, memory utilization, packet drops, routing tables, logged data, address resolution protocol (ARP) tables, etc.

A computation layer 118 uses the data in storage layer 110 to provide information to a user interface layer 126. A model schema 119 identifies the general relationships and properties associated with entities in datacenter 102. Data models 120 represent the particular performance data 112 and configuration data 114 associated with the entities in datacenter 102. For example, CPU and memory utilization, logical and physical connections, end-to-end communication paths, logical layer 2 and layer 3 network connections, application topologies, VXLAN topologies, port groups, etc. Some data models 120 are manually created and other data models 120 may be dynamically generated.

Analytics engine 122 automatically monitors and identifies data and other events. Analytics engine 122 may include event detectors that identify significant events in datacenter 102. For example, the event detector may identify configuration changes and performance data representing the performance status of datacenter 102. Analytics engine 122 may also operate as outlier detector that identifies events that are outside normal operating levels. For example, an outlier detector may identify CPU utilization above a particular threshold level. Analytics engine 122 may also operate as a problem detector that identifies problems in datacenter 102. For example, the problem detector may identify large packet losses or configuration mismatches between entities.

Search engine 124 conducts natural language searches within datacenter 102 and identifies a search query intent based on model schema 119 and a datacenter dictionary. Instead of operating just on keywords, search engine 124 also understands search query phrases that may be part natural language and part expression. This provides richer intent expression, greater ease of use, and applies well to the datacenter problem domain. For example, a search term such as TROUBLESHOOT may cause search engine 124 to search problem data generated by analytics engine 122.

Search engine 124 may operate as a time machine executing queries for specified time intervals. For example, a user may enter a search term requesting search engine 124 to show all configuration changes for a specified network over the past two days. In another example, the user may enter a search term requesting CPU usage for a host device over the last two days. Data models 120 may be configured in a unique time series format that enables search engine 124 to quickly identify events for any selectable time period.

Data models 120 may include identifiers associated with different physical and virtual entities, networks, performance data, and/or configuration data. Search engine 124 may search for data or provide search suggestions based on data models 120. For example, one of data models 120 for a virtual firewall may contain firewall rules. A user may enter the search term RULES. Search engine 124 may identify the firewall rules in the model or provide a suggestion for displaying the rules identified in the virtual firewall model.

User interface layer 126 includes a search interface 128 for receiving search queries and displaying search results. Search interface 128 may receive natural language based expressions for search engine 124 and display the results from search engine 124 in a textual and/or graphical format. A visualization manager 130 generates topology diagrams representing different entities and network configurations within the datacenter.

A collaboration manager 132 captures particular states of the datacenter and enables different users to view, share, and manipulate the captured states. For example, a first user may identify a network state where a large number of packets are being dropped. The first user may direct collaboration manager 132 to capture that state of the network and identify a second user for sharing the captured state. The second user can access the captured network state and perform additional analysis.

A newsfeed manager 133 identifies and displays events of particular interest to the user. For example, newsfeed manager 133 may identify a search index and/or search history 116 for a user currently logged on to the system. For example, a user may have previously performed search queries for a particular logical network. When the user logs in, newsfeed manager 133 may automatically display events associated with the previously queried logical network.

Figure 2A:
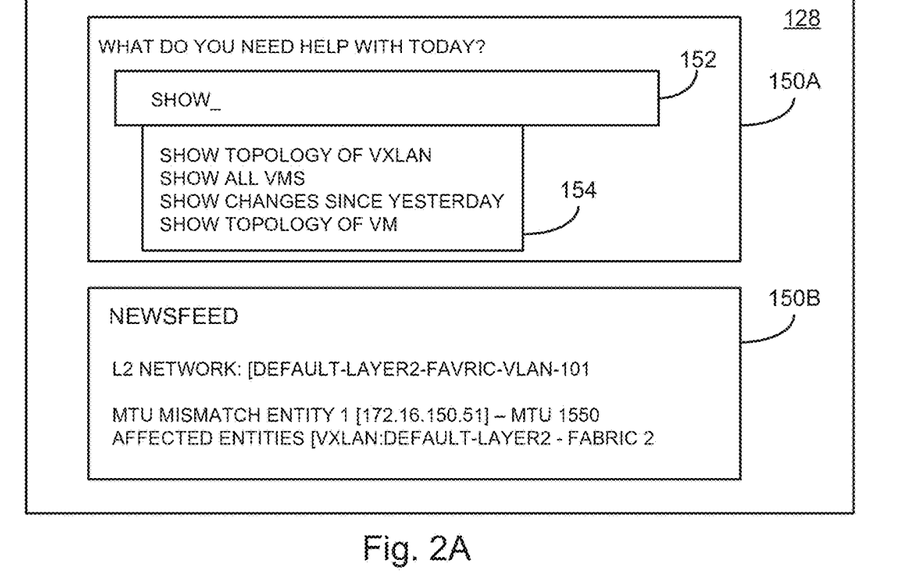
FIGS. 2A and 2B depict example information displayed by the management system.

FIG. 2A depicts example screen sections 150A and 150B displayed within a computer screen by search interface 128. Referring to FIGS. 1 and 2A, analytics engine 122 monitors and identifies events associated with the datacenter models. The search engine operates in conjunction with the models and associated data to provide search suggestions and search results corresponding with the datacenter information.

For example, the user may enter the search term SHOW into search field 152. Search interface 128 may submit the search term to the search engine and display received back suggestions in drop down menu 154. For example, search interface 128 may display suggestions for showing a topology for VXLAN, showing all VMs, showing changes in a network since yesterday, or showing a topology for a VM. In another example, the user may enter the search term V into search field 152. User interface may display suggestions in drop down menu 154, such as virtual, VXLAN, VM, etc. The suggestions may be based on the models and the names of entities identified in the models or may be based on a datacenter library that may include names of datacenter entities. The suggestions and search results also may be based on search history 116. For example, search engine 124 may store previous search queries and provide at least some suggestions that are weighted based on the most frequently requested networks, entities, and data.

Search interface 128 may display newsfeed data from newsfeed manager 133 within screen section 150B. The newsfeed data in screen section 150B is searchable since the events, anomalies, and/or changes are first class objects like any other objects in the search system, wherein events are stored and indexed in a manner similar to that for other physical and logical entities and are a part of the datacenter model, dictionary etc. In this example, the newsfeed data identifies a layer 2 network and identifies a maximum transmission unit (MTU) mismatch within a VXLAN. Newsfeed manager 133 may automatically generate the data in screen section 150B based on user configuration setting.

Figure 2B:
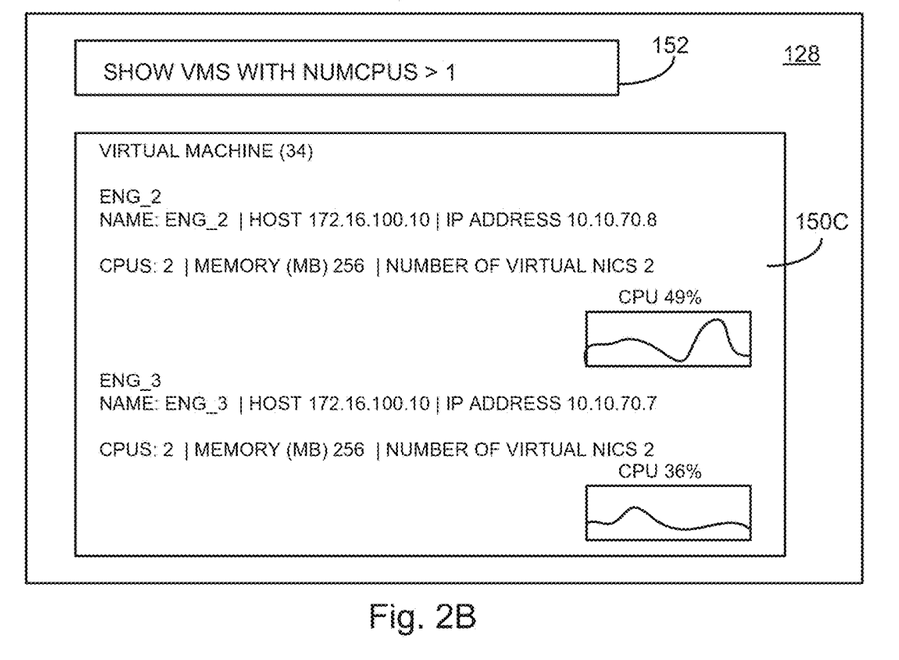

FIG. 2B depicts an example screen section 150C displayed within a computer screen by the search interface 128. In this example, the user enters the search term: SHOW VMS WITH NUMCPUS>1. Search engine 124 searches VMs models for any configuration data indicating more than one CPU. Search interface 128 displays the names of any identified VMs, number of CPUs, the host device IP address, memory capacity, and number of virtual NICs connected to the VM. Search interface 128 also may display a graph showing the percentage of CPU bandwidth used by the different virtual machines.

Search engine 124 and search interface 128 together function as a search system that provides interpretation of computer network status search queries that are entered by users, and performs corresponding searches relating to datacenter 102. Examples of interpretations of computer network status search queries, which are syntactically similar, include:

"vm web-vm-1"=>"find virtual machine named web-vm-1" since web-vm-1 looks like a virtual machine name.

"vm 192.168.0.0/16"=>"find all virtual machines in subnet 192.168.0.0/16" since 192.168.0.0/16 depicts a subnet.

"vm cpu 1"=>"find virtual machines where num cpu=1" since cpu probably refers to property called "num cpu" and 1 is a possible value for this property.

"vm powered on"=>"find virtual machines where power state=on" since "powered on" is commonly used to refer to property "power state" having the value "on".

In some instances, a computer network search query can suggest more than one interpretation, even if one interpretation is deemed more likely than another, so that the more-likely interpretation is offered as a default, but a user-selectable alternative interpretation is also offered:

"vm cpu"=>"show num cpu, cpu usage of virtual machines" since cpu probably refers to cpu related properties, but an alternative user-selectable interpretation that is offered can be "find virtual machine named cpu".

"vm not behind firewall"=>"find virtual machines where firewall status='unprotected' or firewall status='excluded'" since "not behind firewall" refers to property "firewall status" having a value 'unprotected' or 'excluded,' but an alternative user-selectable interpretation that is offered can be "find virtual machines where firewall status='unprotected'" as the user might only be interested in property "firewall status" having the value "unprotected".

As illustrated by the examples above, search queries with similar syntactic structure can have very different interpretations.

Figure 3:
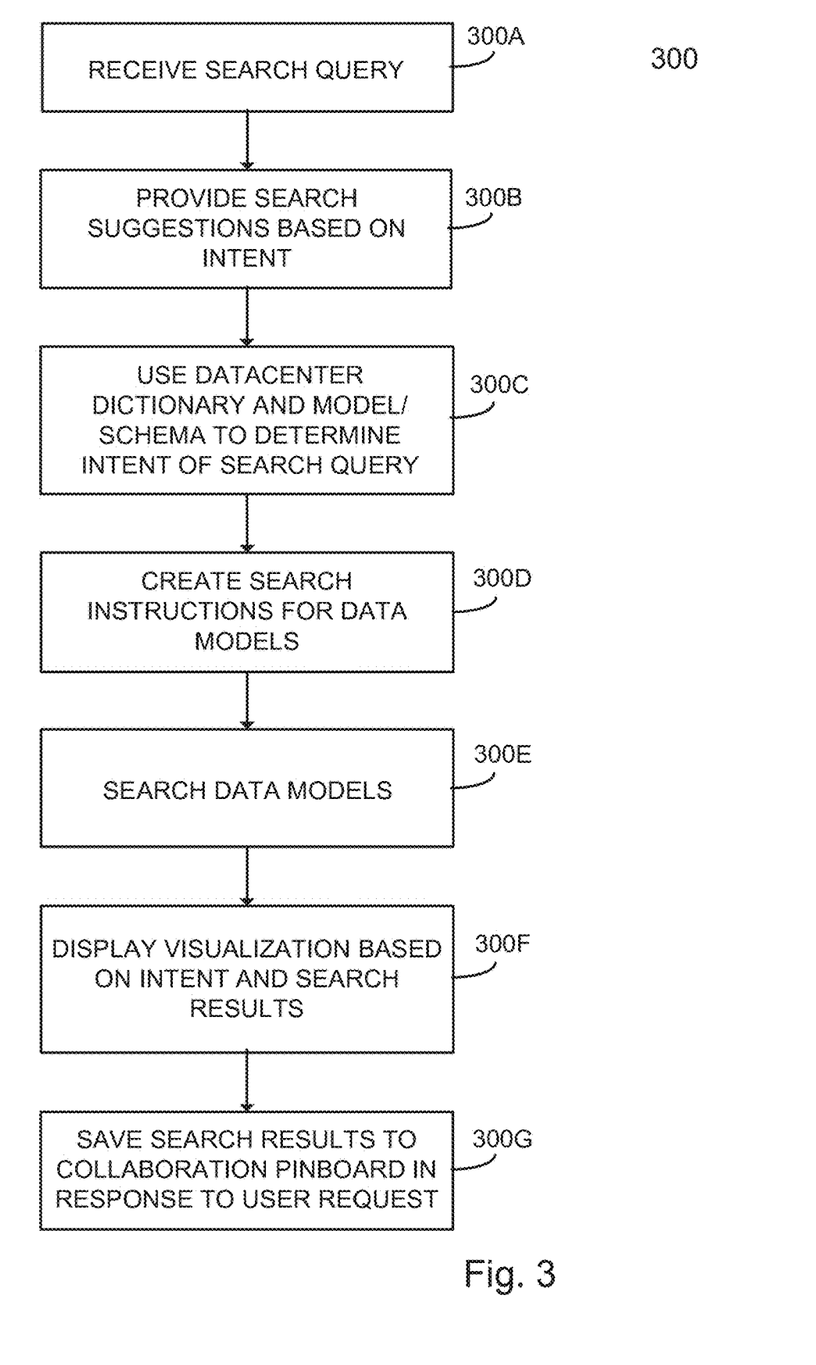
FIG. 3 is a flow diagram of an example process for searching and visualizing information in a datacenter context.

FIG. 3 depicts one example of a method 300 by which the search engine provides datacenter contextual search query interpretation. The search engine in operation 300A receives a search query. Again, the search query may be based on a text input into a search field or may comprise selection of elements within a displayed topology.

Operation 300B may display search suggestions based on keywords in the search query. For example, based on the keyword TROUBLESHOOT, the search engine may display a set of search suggestions that identify different types of networks and entities associated with possible performance problems. If problem data exists, the search engine may display suggestions for the particular networks and network entities that are associated with the current or previous problems.

In operation 300B, the search engine uses the datacenter dictionary and the model/schema to determine the intent of the search query. For example, the search query may include the keyword TROUBLESHOOT LOGICAL NETWORK ABC. In this example, the search engine determines via the datacenter dictionary that the query intent is to identify past or present problems with logical network ABC.

The search engine identifies any time periods associated with the search query. For example, the search query may include a specific time period, such as a time of day, day, year, etc. If no time period is explicitly selected, the search engine may assume a time period, such as the current hour and day. The search engine may also assume the time period based on the search query intent. For example, if a user enters the search term TROUBLESHOOT LOGICAL NETWORK ABC, the search engine may assume the search should progress from a current day back in time to identify any problem data associated with the logical network ABC.

Operation 300D generates instructions based on the intent for searching the data models. The instructions may be scripts identifying data entity names, relationships, and parameters in the data models. Operation 300E uses the instructions to search the data models. As explained above, the execution scripts may identify data associated with particular time periods.

Operation 300F displays a visualization of the topology, entities, and data associated with the search results. For example, the visualization manager displays the topology for a network identified in the search query and identifies elements within the topology of the network. The visualization manager may display other related information, such as any configuration changes or events associated with the entities in the network.

Operation 300G may save the search results to a collaboration pinboard in response to a user request. As mentioned above a user may select an icon for saving search results to a pinboard. The collaboration manager may copy the currently displayed data into a collaboration database. The user may then link other users to the collaboration database.

Predicate Pushdown

The management system performs unique predicate pushdowns that convert a join into a union. This enables access to relationships between objects (perform object traversal). For example, the search term FIND VMS WHERE SWITCH.CPUUTIL>90% may find virtual machines with a connected switch experiencing CPU over use.

The management system can also compute predicates on time series and scalars. For example, the search term FIND VMS WHERE AVERAGE (PACKETSLOST/(PACKETSSENT+PACKETSRECVD))>1% YESTERDAY finds machines where packet loss exceeds 1%, averaged over yesterday. Users can also run persistent queries for creating alerts.

Dynamic programming combines multiple smaller parsers. The smaller parsers are based on CFG (which isn't LALR (k) or LA (k) or LL (k)). For example, a user may enter the query: FIND MACHINES WHICH HAVE CPU COUNT>2 OR CPU UTILIZATION>80% TODAY. Data may consist of all performance data joined with each (multiple versions of) configuration state. The relational algebra equivalence would be a series of self joins on configuration data joined with performance data. The management system may convert this "join" to a union with appropriate predicate pushdown.

For example, consider the following:
select*from A join B on A.id=B.id where A.a2=x OR B.b2=y.

Normally disjuncts (ORs) are not pushed down. The following equation is not equivalent to the one above:
select*from (select*from A where A.a2=x) as A'JOIN (select*from B where B.b2=y) as B' on A'.a=B'.b.

This is because pre-filtering A might prevent some tuples which would have otherwise joined with B, where B.b2=y. The A and B elements comprise a configuration store and a metric store. The management system uses domain knowledge that the join condition comprises a one to one correspondence between rows of A and B barring timestamps.

Therefore the elements can be written as:
WITH select id from (select*from A where A.a2=x) as A' UNION (select*from B where B.b2=y) as B' on A'.id=B'.id AS T1 select*from (select*from A JOIN B on A.id=B.id) as M JOIN t1 on M.id=t1.id;

Thus, the management system obtains an identifier from A that satisfies predicate on A.a2. The identifier is then unioned with the identifiers from B that satisfy predicate on B.b2. Then the management system fetches any other attributes required for identifiers in this identifier set. In general, this is valid when the two tables being joined have the same primary key.

Search query interpretation method 200 provides interpretation of a user-generated computer network search query to conduct a search relating to status or characteristics of a computer network, such as a datacenter. The search system utilizes a two phase approach to solve this complexity. The user-generated computer network search query is translated into a structured search query, thereby to reduce or minimize ambiguity that could be inherent in the user-generated computer network search query.

For example, a user-generated computer network search query such as "vms behind firewall", the first phase translates it to "vms where firewall status=protected or firewall status=old rules".

Translation identifies entity types and their aliases. For example, "virtual machine" is an entity which has "vm" as its alias.

Properties, their types and their aliases. For example, "virtual machine" has a property called "num cpus" which is a numeric property and has "number of cpus", "count of cpus", "number of cores" and many more such aliases.

Meta aliases for properties. For example, "virtual machine" has a property "cpu" which refers to both "num cpus" and "cpu usage".

Common terms used in natural language. For example, "powered on" or "on" refers to a property called "power state" having a specific value "on".

Translation of the user generated computer (datacenter) search query may include any or all of various heuristics including:

Identifying arbitrary entity terms indicating network elements (e.g., "vm," "vms," and natural language variations such as "virtual machine") and converting them to standardized entity terms Identifying prepositional terms indicating relationships between network elements (e.g., "behind") and converting the prepositional terms to corresponding network-specific characteristics or relationships (e.g., a specific characteristic status)

Machine learning from past queries to arrive at appropriate scores for interpretations, user's choice between ambiguous queries from past using 'did you mean' or 'like it' kind of feedback interactions (vm abc xyz==>vm abc property xyz or vm abc and xyz?)

For each of these translation heuristics, Entity terms, Propositional terms, Machine Learning, User Feedback, etc., a translation table is maintained to provide translation from likely user-generated terminology and syntax to structured search query terminology and syntax. It will be appreciated that such translation heuristics may be applied in part and then also applying a keyword-type search to a portion of the query that was successfully translated.

After translation, the translated computer network search query is parsed and interpreted, and the search is conducted. For a typical search query, parsing entails extracting several types of information from the translated search query to define the terms and sequencing of the search to be conducted. The search query parsing may be implemented as a single integrated parsing of a search query or as different parsings of different types of information or terminology in the translated search query. For example, parsing may identify any or all of:

Which entities need to be queried? (Identifying entities in a query)

What aspects of those entities is the user interested in? (Identifying entity-specific characteristics in the query)

What predicates need to be applied and in which order? (Identifying and applying predicates in the order, including an ordering or sequencing of the predicates)

What is the relevant time range for the query? (Identifying time characteristics in the query)

Any other classes of information parsed?

Do the results need to be sorted on certain properties? If so, in which order?

Do the results need to be aggregated by certain properties?

What meta entities to be queried and if they should be searched inside child entities or inside meta entities? (Identifying preposition terms or meta-entities, which that can indicate small or large associations or groups of other entities by some concept—such as all vms in source group of a firewall rule x, or all vms in security group container Y)

For example: A set of VMs can be called a container entity of a type (say, all VMs in a source group of a firewall rule), and a group of entities by some common behavior/representation can be called meta entity like change event of X, change of type B etc. All these may also be represented and searchable both as meta-entity 'change' as well as individual entity 'type X' or 'type Y'). Subject entity vs object entity bear same interpretation as subject vs object in any English sentences by grammar rules.

Moreover, parsing may be applied is different combination or sequences, before providing a search result, to identify a result that is more likely a correct result of the original search query. For example, the query "vms with high cpu usage between mon and fri this week" has the same interpretation as "vms between mon and fri this week which had high cpu usage." However, the query "vm abc cpu" has a very different result than the similar-sounding query "vm abc, cpu or vm abc cpu-count or vm abc cpu-usage". For search query 'vm num cpu>1', the likely result would correspond to the query 'vm where num cpu>1' and not 'vm named num where cpu>1'. Moreover, a sequence of interpreted queries can be provided to identify which interpreted query is selected or accepted. In some implementations, the order or sequence of providing such interpreted queries can be adapted according to past selections.

As described above, a user can specify various kinds of predicates for filtering search results. These predicates can be based on configuration properties, runtime properties and metric properties. Combining configuration and metric information into one search query in this manner can be a useful tool. For example, "vms in resource pool foo where num cpus<=2 and cpu usage>90%" where 'foo' is a production resource pool can be used to identify vms with less cpus which are running short of compute resources.

In the case where a search query doesn't result in any results or if it doesn't get parsed, a full text search may be executed as a fallback, based upon keywords mentioned in the original search query. The full text query may identify and retrieve configuration and runtime properties that have been indexed in the system with reference to the keywords. A full text search of keywords mentioned in the search query may be executed against the entities stored in the system. For example, if the search query 'vms 2' doesn't give results when executed as 'find vms named 2', then a full text search for value '2' will yield vms which have some indexed property with value 2.

In one implementation, partial search query parsing may be employed during user-entry of a search query to provide autocomplete suggestions, thereby allowing the user to selected a proposed autocomplete search query without the user having to completely enter it. Set forth below is an example of autocomplete suggestions that could be provided by partial search query parsing while a user is typing the query "vm where cpu count=1":

1. When the user has typed 'v', the interface may suggest entity types that start with 'v'.
v:
vm
vlan
vxlan 2. When the user has typed "vm" which is an entity type, the interface will suggest some keywords that can come after entity type:
vm:
vms where powerstate<OPERATOR>
vms not in vxlans
vms in
vms where num cores 3. When the user is typing a property name, the interface will suggest property names based on what the user has typed so far.
vm where cpu c:
vm where cpu count vm where cpu consumption
vm where cpu costop 4. When the user has typed the complete property name, the interface will suggest the operators and type of value that match the property name. In this case, "cpu count" is a numeric property.
vm where cpu count:
vm where cpu count<<NUMBER>
vm where cpu count><NUMBER>
vm where cpu count=<NUMBER>
vm where cpu count<=<NUMBER>
vm where cpu count>, <NUMBER>

5. When the user has typed property name and operator, the interface will suggest the type of value that match them. In this case, "cpu count" is a numeric property.
Vm where cpu count=:
vm where cpu count=<NUMBER>

Figure 4:
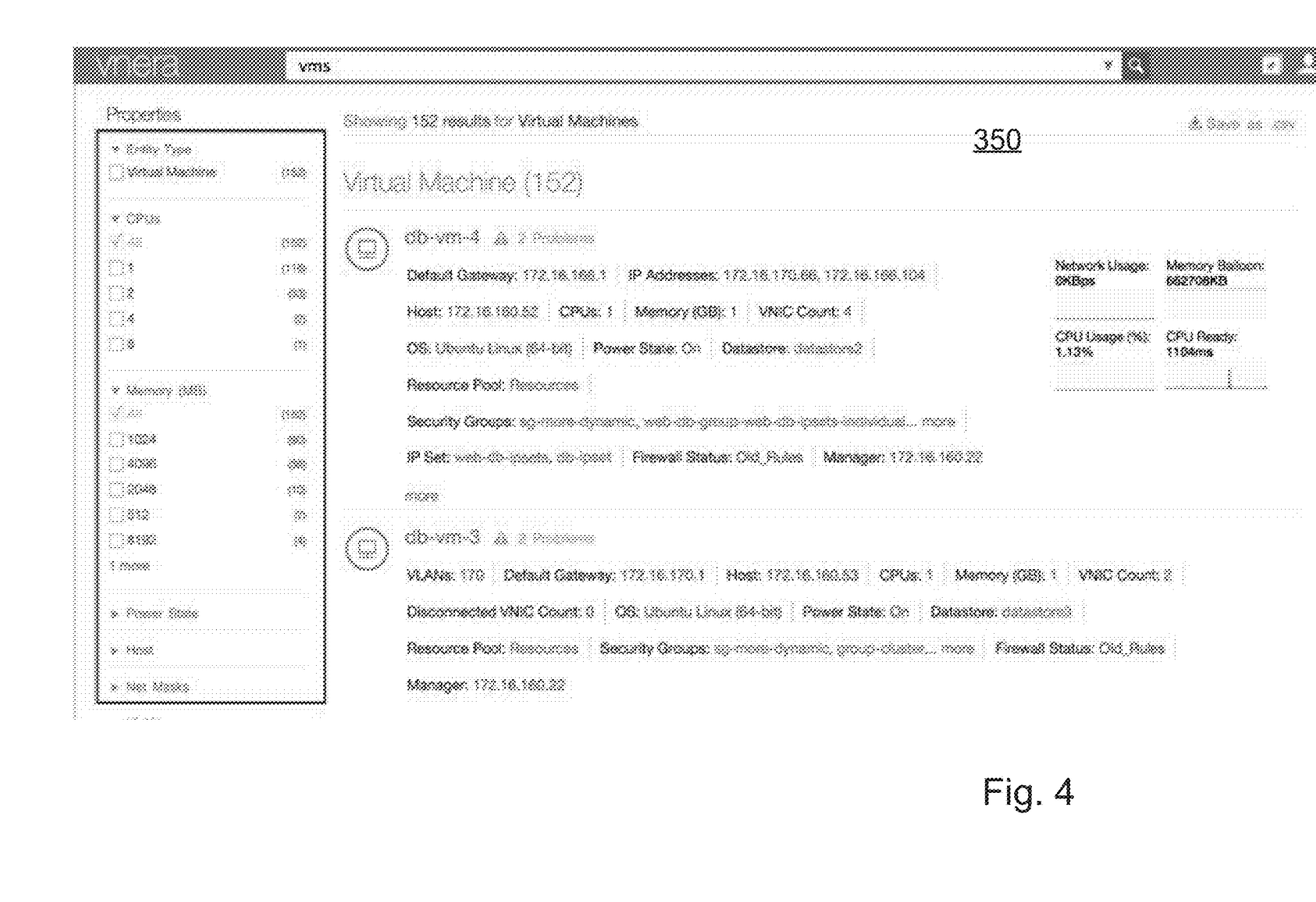
FIG. 4 is an illustration of a faceted search navigation user interface.

When the user completes a predicate, the system will suggest operators that can be used to combine predicates in case the user wants to enter more predicates.
Vm where cpu count=1:
vm where cpu count=1 AND
vm where cpu count=1 OR Faceted Search Navigation In another implementation, the method may include faceted search navigation, which would allow a user to further filter the results of a search query based on displayed choices of different properties of entities in the search results, without any need to write complex search queries. FIG. 4 illustrates an example of such a faceted search navigation user interface 350. Faceted navigation includes providing with search results a user-interface that lists properties included in the search results, together with user-selectable options, ranges, etc. for those properties.

In the example of faceted search navigation user interface 350, an entered search query "vms" provides 152 results for virtual machines in the network space of the management system and lists details of two or more of the 152 virtual machines. In addition, in connection with faceted search navigation, a properties table of additional user-selectable properties such as the number of CPUs associated with the virtual machines (e.g., 1, 2, 4, or 8), the amount of memory associated with each virtual machine (e.g., 1024 MB, 4096 MB, 2048 MB, 512 MB, or 8192 MB, etc.), the power states of the virtual; machines, the hosts where the virtual machines reside, the net masks associated with the virtual machines, etc.

Take as example the query "vms in resource pool foo where num cpus<=2 and cpu usage>90%". As illustrated in FIG. 4, the user executed search query "vms" resulted in all the virtual machines included in the search results. Along with the results, facets on several properties that are applicable for virtual machines are displayed by the user interface, which show. By looking at the facet for the property "num cpus", the user can easily see the values for that property and their distribution. In this example, the user selected the value "1" and "2". Now the result list is filtered by this selection which is equivalent to the query "vms where num cpus<=2". The user can then select "foo" in the resource pool facet and select the "90-100%" range in the cpu usage facet. This interactive and iterative approach is quite powerful as users can write incremental queries and see the interim results as they continue to add more filters via facets.

Figure 5:
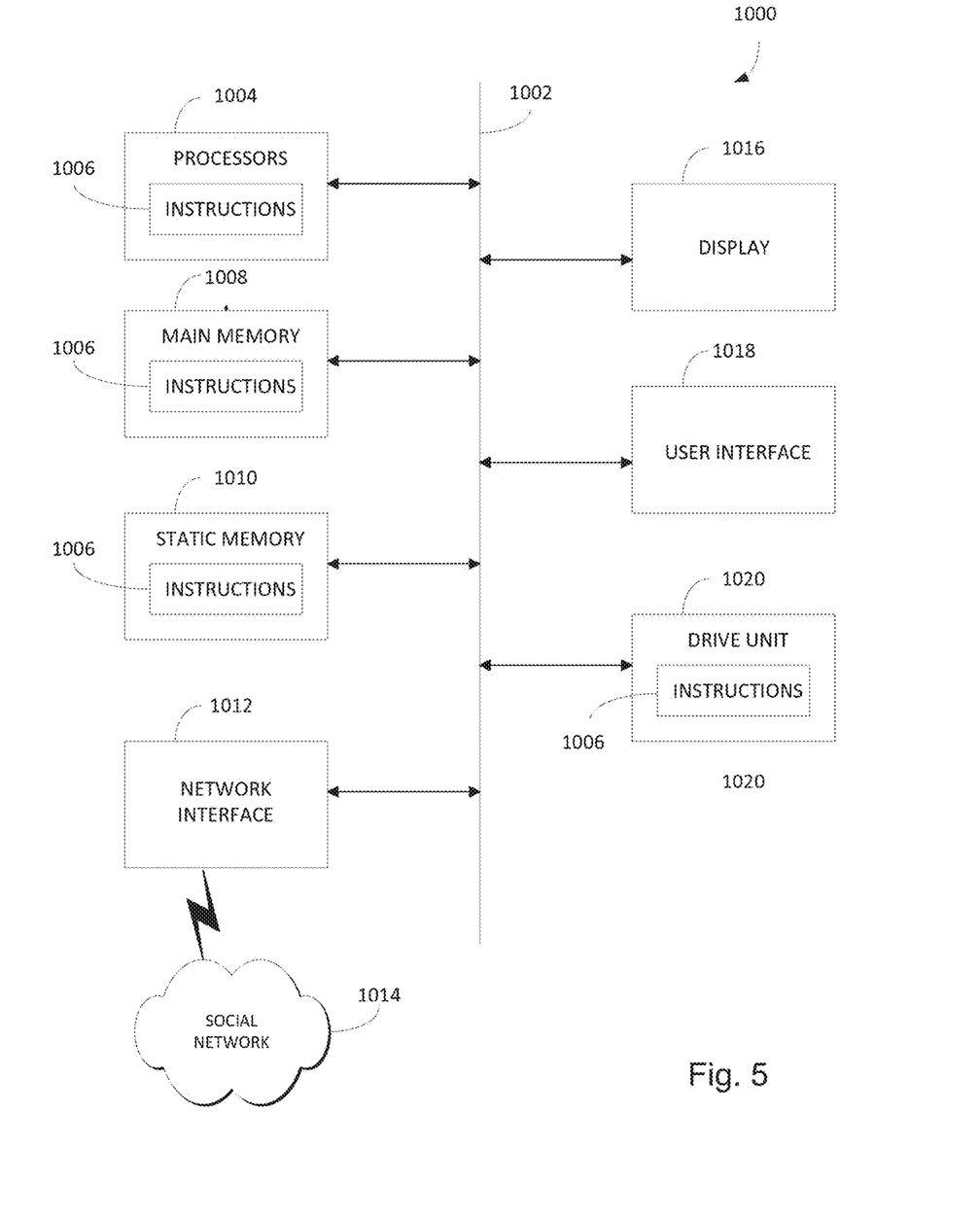
FIG. 5 depicts an example computing device for implementing the datacenter management system.

FIG. 5 shows a computing device 1000 that may be used for operating the datacenter management system and performing any combination of processes discussed above. The computing device 1000 may operate in the capacity of a server or a client machine in a server-client network environment, or as a peer machine in a peer-to-peer (or distributed) network environment. In other examples, computing device 1000 may be a personal computer (PC), a tablet, a Personal Digital Assistant (PDA), a cellular telephone, a smart phone, a web appliance, or any other machine or device capable of executing instructions 1006 (sequential or otherwise) that specify actions to be taken by that machine.

While only a single computing device 1000 is shown, the computing device 1000 may include any collection of devices or circuitry that individually or jointly execute a set (or multiple sets) of instructions to perform any one or more of the operations discussed above. Computing device 1000 may be part of an integrated control system or system manager, or may be provided as a portable electronic device configured to interface with a networked system either locally or remotely via wireless transmission.

Processors 1004 may comprise a central processing unit (CPU), a graphics processing unit (GPU), programmable logic devices, dedicated processor systems, micro controllers, or microprocessors that may perform some or all of the operations described above. Processors 1004 may also include, but may not be limited to, an analog processor, a digital processor, a microprocessor, multi-core processor, processor array, network processor, etc.

Some of the operations described above may be implemented in software and other operations may be implemented in hardware. One or more of the operations, processes, or methods described herein may be performed by an apparatus, device, or system similar to those as described herein and with reference to the illustrated figures.

Processors 1004 may execute instructions or "code" 1006 stored in any one of memories 1008, 1010, or 1020. The memories may store data as well. Instructions 1006 and data can also be transmitted or received over a network 1014 via a network interface device 1012 utilizing any one of a number of well-known transfer protocols.

Memories 1008, 1010, and 1020 may be integrated together with processing device 1000, for example RAM or FLASH memory disposed within an integrated circuit microprocessor or the like. In other examples, the memory may comprise an independent device, such as an external disk drive, storage array, or any other storage devices used in database systems. The memory and processing devices may be operatively coupled together, or in communication with each other, for example by an I/O port, network connection, etc. such that the processing device may read a file stored on the memory.

Some memory may be "read only" by design (ROM) by virtue of permission settings, or not. Other examples of memory may include, but may be not limited to, WORM, EPROM, EEPROM, FLASH, etc. which may be implemented in solid state semiconductor devices. Other memories may comprise moving parts, such a conventional rotating disk drive. All such memories may be "machine-readable" in that they may be readable by a processing device.

"Computer-readable storage medium" (or alternatively, "machine-readable storage medium") may include all of the foregoing types of memory, as well as new technologies that may arise in the future, as long as they may be capable of storing digital information in the nature of a computer program or other data, at least temporarily, in such a manner that the stored information may be "read" by an appropriate processing device. The term "computer-readable" may not be limited to the historical usage of "computer" to imply a complete mainframe, mini-computer, desktop, wireless device, or even a laptop computer. Rather, "computer-readable" may comprise storage medium that may be readable by a processor, processing device, or any computing system. Such media may be any available media that may be locally and/or remotely accessible by a computer or processor, and may include volatile and non-volatile media, and removable and non-removable media.

Computing device 1000 can further include a video display 1016, such as a liquid crystal display (LCD) or a cathode ray tube (CRT)) and a user interface 1018, such as a keyboard, mouse, touch screen, etc. All of the components of computing device 1000 may be connected together via a bus 1002 and/or network.

For the sake of convenience, operations may be described as various interconnected or coupled functional blocks or diagrams. However, there may be cases where these functional blocks or diagrams may be equivalently aggregated into a single logic device, program or operation with unclear boundaries.

It will be obvious to those having skill in the art that many changes may be made to the details of the above-described embodiments without departing from the underlying principles of the invention. The scope of the present invention should, therefore, be determined only by the following claims.

The invention claimed is:

1. A method, comprising:
receiving a user-generated computer network search query;
interpreting the user-generated computer network search query based on relationships and properties of physical entities of a datacenter and relationships and properties of virtual entities of the datacenter;
generating search suggestions based on the interpretation of the user-generated computer network search query and independent of user intervention;
determining that the user-generated computer network search query does not include a time period;
inferring a time period associated with the user-generated computer network search query based on the interpretation of the user-generated computer network search query;
searching a data model associated with the datacenter for results from the inferred time period based on a user-selected one of the search suggestions;
displaying a graphical visualization of the results of searching the data model, wherein the results of searching the data model include a topology diagram representing corresponding physical entities of the datacenter or corresponding virtual entities of the datacenter;
receiving a selection, made using the graphical visualization, of one of a plurality of values of a property associated with the virtual entities of the datacenter; and
displaying a graphical visualization of a subset of the results of the searching the data model having the selected one of the plurality of values of the property.

2. The method of claim 1, wherein receiving the user-generated computer network search query includes identifying a user-selected physical entity or a user-selected virtual entity of the datacenter selected from a graphical display of the physical entities and the virtual entities of the datacenter.

3. The method of claim 1, wherein the user-generated computer network search query includes a natural language expression relating to the physical entities or the virtual entities of the datacenter.

4. The method of claim 1, further comprising sharing the graphical visualization of the results with users of the datacenter.

5. The method of claim 1, wherein the interpretation of the user-generated computer network search query is further based on a datacenter dictionary associated with the datacenter.

6. The method of claim 1, further comprising interpreting the user-generated computer network search query based on identifiers associated with the physical entities of the datacenter, identifiers associated with the virtual entities of the datacenter, performance data associated with the physical entities or the virtual entities, or configuration data associated with the physical entities or the virtual entities.

7. The method of claim 1, wherein interpreting the user-generated computer network search query includes:
   translating the user-generated computer network search query into a structured search query based on heuristics associated with the datacenter;
   parsing the structured search query; and
   interpreting the parsed structured search query based on the relationships and the properties of the physical entities of the datacenter and the relationships and the properties of the virtual entities of the datacenter.

8. A system, comprising:
   a search interface of a computing device configured to:
      receive a user-generated computer network search query;
      interpret the user-generated computer network search query based on relationships and properties of physical entities of a datacenter and virtual entities of the datacenter; and
      generate search suggestions based on the interpretation of the user-generated computer network search query and independent of user intervention;
   a search engine comprising instructions executable by a processing resource to cause a computing system to:
      determine that the user-generated computer network search query does not include a time period;
      infer a time period associated with the user-generated computer network search query based on the interpretation of the user-generated computer network search query; and
      search a data model associated with the data center for results from the inferred time period based on a user-selected one of the search suggestions; and
   a visualization manager comprising instructions executable by the processing resource to cause the computing system to:
      display a graphical visualization of the results of searching the data model, wherein the results of searching the data model include a topology diagram representing corresponding physical entities of the datacenter or corresponding virtual entities of the datacenter;
      receive a selection, made using the graphical visualization, of one of a plurality of values of a property associated with the virtual entities of the datacenter; and
      display a graphical visualization of a subset of the results of the searching the data model having the selected one of the plurality of values of the property.

9. The system of claim 8, wherein the user-generated computer network search query includes a user-selected physical entity or a user-selected virtual entity of the datacenter selected from a graphical display of the physical entities and the virtual entities of the datacenter.

10. The system of claim 8, wherein the user-generated computer network search query includes a natural language expression relating to the physical entities or the virtual entities of the datacenter.

11. The system of claim 8, further comprising a collaboration manager comprising instructions executable by the processing resource to cause the computing system to share the graphical visualization of the results users of the datacenter.

12. The system of claim 8, wherein the search interface is further configured to interpret the user-generated computer network search query based on identifiers associated with the physical entities of the datacenter, identifiers associated with the virtual entities of the datacenter, performance data associated with the physical entities or the virtual entities, or configuration data associated with the physical entities or the virtual entities.

13. The system of claim 8, wherein the search interface is further configured to:
   translate the user-generated computer network search query into a structured search query based on heuristics associated with the datacenter;
   parse the structured search query; and
   interpret the parsed structured search query based on the relationships and the properties of the physical entities of the datacenter and the relationships and the properties of the virtual entities of the datacenter.

14. A non-transitory machine-readable medium storing instructions executable by a processing resource to cause a computing system to:
   receive a user-generated computer network search query;
   interpret the user-generated computer network search query based on relationships and properties of physical entities of a datacenter and relationships and properties of virtual entities of the datacenter;
   generate search suggestions based on the interpretation of the user-generated computer network search query and independent of user intervention;
   determine that the user-generated computer network search query does not include a time period;
   infer a time period associated with the user-generated computer network search query based on the interpretation of the user-generated computer network search query;
   search a data model associated with the datacenter for results from the inferred time period based on a user-selected one of the search suggestions; and
   display a graphical visualization of the results of searching the data model, wherein the results of searching the data model include a topology diagram representing corresponding physical entities of the datacenter or corresponding virtual entities of the datacenter;
   receive a selection, made using the graphical visualization, of one of a plurality of values of a property associated with the virtual entities of the datacenter; and
   display a graphical visualization of a subset of the results of the searching the data model having the selected one of the plurality of values of the property.

15. The medium of claim 14, further comprising instructions to interpret the user-generated computer network search query based on identifiers associated with the physical entities of the datacenter, identifiers associated with the virtual entities of the datacenter, performance data associated with the physical entities or the virtual entities, or configuration data associated with the physical entities or the virtual entities.

* * * * *